United States Patent
Wirth et al.

(10) Patent No.: US 7,572,305 B2
(45) Date of Patent: Aug. 11, 2009

(54) EXHAUST GAS PURIFICATION FOR INTERNAL COMBUSTION ENGINES AND METHOD FOR OPERATING THE SAME

(75) Inventors: Ralf Wirth, Leonberg (DE); Dirk Samuelsen, Ludwigsburg (DE); Klaus Mueller, Tamm (DE); Carsten Becker, Kernen (DE)

(73) Assignee: Robert Bosch GmbH, Stuttgart (DE)

( * ) Notice: Subject to any disclaimer, the term of this patent is extended or adjusted under 35 U.S.C. 154(b) by 512 days.

(21) Appl. No.: 10/571,105

(22) PCT Filed: Jul. 22, 2004

(86) PCT No.: PCT/DE2004/001611

§ 371 (c)(1),
(2), (4) Date: Mar. 8, 2006

(87) PCT Pub. No.: WO2005/026507

PCT Pub. Date: Mar. 24, 2005

(65) Prior Publication Data

US 2007/0000218 A1  Jan. 4, 2007

(30) Foreign Application Priority Data

Sep. 11, 2003  (DE) ................................ 103 41 949

(51) Int. Cl.
*B01D 46/00*  (2006.01)
*F01N 3/023*  (2006.01)
(52) U.S. Cl. .................. 55/282.3; 55/385.3; 55/523; 55/524; 55/DIG. 5; 55/DIG. 10; 60/297; 60/299; 60/303; 60/311; 95/278; 95/14; 95/15; 95/19; 95/20; 701/102; 701/114

(58) Field of Classification Search ................ 55/282.2, 55/282.3, 385.3, 523, 524, DIG. 5, DIG. 10, 55/DIG. 30; 95/273, 278, 14, 15, 19, 20; 60/277, 297, 299, 303, 311; 701/102, 114
See application file for complete search history.

(56) References Cited

U.S. PATENT DOCUMENTS

| 4,319,896 A | 3/1982 | Sweeney |
| 4,331,454 A * | 5/1982 | Sweeney .................. 95/278 |
| 4,719,751 A * | 1/1988 | Kume et al. ................ 60/278 |
| 4,835,964 A | 6/1989 | Kume et al. |
| 5,171,335 A | 12/1992 | Kojima et al. |
| 6,883,309 B2 * | 4/2005 | Jobson et al. ............... 60/297 |
| 7,031,827 B2 * | 4/2006 | Trudell et al. .............. 60/277 |

(Continued)

FOREIGN PATENT DOCUMENTS

EP  0 480 396 A1  4/1992

(Continued)

*Primary Examiner*—Jason M Greene
(74) *Attorney, Agent, or Firm*—Ronald E. Greigg

(57) ABSTRACT

The present invention relates to an exhaust emission control apparatus for an internal combustion engine and a process for operating it. The exhaust emission control has a particulate filter for filtering particulate matter from the exhaust of the internal combustion engine, at least one temperature sensor for detecting the temperature of the exhaust, an evaluation unit for evaluating the detected temperature, particularly with regard to a particulate mass burned during a regeneration operation of the particulate filter. The temperature sensor is positioned inside the particulate filter.

17 Claims, 2 Drawing Sheets

U.S. PATENT DOCUMENTS

| | | | |
|---|---|---|---|
| 7,146,804 B2 * | 12/2006 | Yahata et al. | 60/311 |
| 7,171,803 B2 * | 2/2007 | Saito et al. | 60/311 |
| 7,208,029 B2 * | 4/2007 | Shirakawa et al. | 95/273 |
| 7,247,190 B2 * | 7/2007 | Miura | 55/523 |
| 7,343,735 B2 * | 3/2008 | Wang et al. | 60/311 |
| 2003/0221420 A1 | 12/2003 | Jobson et al. | |

FOREIGN PATENT DOCUMENTS

| | | |
|---|---|---|
| JP | 58-64816 | 5/1983 |
| JP | 3-18614 | 1/1991 |
| JP | 5-179930 | 7/1993 |
| JP | 6-159040 | 6/1994 |
| JP | 7-63039 | 3/1995 |
| JP | 7-224637 | 8/1995 |
| JP | 8-42326 | 2/1996 |
| JP | 8-218847 | 8/1996 |
| WO | WO 02/29218 A1 | 4/2002 |

* cited by examiner

EXHAUST GAS PURIFICATION FOR INTERNAL COMBUSTION ENGINES AND METHOD FOR OPERATING THE SAME

CROSS-REFERENCE TO RELATED APPLICATIONS

This application is a 35 USC 371 application of PCT/DE 2004/001611 filed on Jul. 22, 2004.

BACKGROUND OF THE INVENTION

1. Field of the Invention

The invention relates to an exhaust emission control apparatus for internal combustion engines and a process for operating it. The invention also relates to a computer program for executing this process.

2. Prior Art

Exhaust emission control apparatuses particularly for diesel engines are fundamentally known from the prior art. They are situated in the exhaust flow of diesel engines and typically include a diesel oxidizing converter, followed by a particulate filter. There are several known types of particulate matter filters. In diesel vehicles, standard so-called ceramic honeycomb filters with a monolithic structure are usually used. But pocket filters are also known, which have a structure entirely different from that of a honeycomb filter. The filters do not contain capillaries, but instead contain filter pockets, preferably comprised of sintered metal, and the exhaust flows through the surface of these filter pockets. As the exhaust passes through, the particulate matter contained therein is preferably deposited on the surfaces of the pocket filter.

A common trait of all particulate filters is that particulate matter that has been filtered from the exhaust during operation of the diesel engine accumulates inside the filter. Consequently, if the diesel engine were operated for an excessively long time, an excessive particulate mass would accumulate inside the particulate filter, which would in time choke off the exhaust path, thus causing the engine to break down if the accumulated particulate mass were not removed from time to time.

The periodic removal of accumulated particulate mass usually occurs by switching the particulate filter into a so-called regeneration operating mode. The particulate filter is regularly switched into this mode whenever the diesel engine has driven the vehicle a predetermined distance, for example every thousand kilometers, or whenever a certain particulate mass has accumulated inside the particulate filter. The particulate filter is switched into this regeneration operating mode during a normal operation of the diesel engine by raising the operating temperature of the filter to approximately 600° Celsius through suitable engine measures. Suitable engine measures are those that produce an at least temporary increase in the temperature of the exhaust to the above-mentioned temperature value. This can, for example, be achieved by reducing the supply of fresh air or through a combustion of fuel in the preceding catalytic converter. Both measures lead to the desired increase in the temperature of the exhaust flowing through the particulate filter, thus also effecting the desired increase in its operating temperature. In the regeneration mode occurring at this increased operating temperature, the particulate matter accumulated in the particulate filter is burned off. This combustion occurs exothermically and thus leads to a further pronounced temperature increase beyond the 600° C. temperature mentioned as an example above. The regeneration breaks down the accumulated particulate mass inside the particulate filter by essentially converting the particulate matter into carbon dioxide; this improves the flow through the particulate filter once more, almost restoring it to its initial state. Knowledge of the temperature behavior inside the particulate filter during an above-described regeneration process makes it possible to glean information about the particulate mass combusted and therefore broken down during the regeneration described above, as well as information about the speed at which the particulate matter combustion occurs, i.e. the so-called burn rate.

In the standard honeycomb filters that have been used up to this point, a precise detection of the temperature inside these particulate filters has not been possible because installing a temperature sensor laterally inside these particulate filters, perpendicular to the flow direction, would destroy their filter function; more precisely stated, the installation of the temperature sensor would destroy the capillary honeycomb structure and at least part of the exhaust would then escape unfiltered from the honeycomb structure and flow out into the environment. For this reason, up to this point, only the temperature of the exhaust at the exit from the particulate filter has been measured and possibly also the temperature at the entry into the particulate filter so that evaluation of the temperature values thus detected permits inferences to be drawn about the actual temperature behavior inside the particulate filter. The above-described process, however, yields only an imprecise estimate of the temperature sought, thus permitting only the above-indicated imprecise, calculation-based inferences to be drawn regarding the breakdown of the particulate mass during the regeneration.

It is the object of the present invention is to modify a known exhaust emission control apparatus, to provide a process for its operation, and to provide a corresponding computer program so as to enable a more precise detection of the temperature of the exhaust inside a particulate filter, in particular during the regeneration operation.

SUMMARY OF THE INVENTION

According to this invention, the exhaust emission control features a temperature sensor that is positioned inside the particulate filter to detect the temperature of the exhaust inside the particulate filter.

Particulate matter can be contained in the exhaust of a diesel engine as well as that of an autoignition internal combustion engine. The present invention is therefore not limited to exhaust emission control apparatuses for diesel engines.

Positioning the temperature sensor inside the particulate filter makes it possible to improve the precision of the temperature detection, particularly while the particulate filter is being operated in a regeneration operating mode. The resulting, more precise knowledge about the temperature behavior in the filter during the regeneration enables more precise inferences to be drawn regarding the beginning and end of the regeneration and regarding the complete breakdown of the particulate mass. At the same time, these more precise temperature values provide more precise information about the chronological course of the particulate breakdown, i.e. on the one hand more precise information about the particulate mass still contained in the particulate filter at a certain point in time during the regeneration or about the current burn rate at a certain point in time, i.e. the speed at which the particulate matter is being broken down.

So-called pocket filters are particularly well-suited to having a temperature sensor installed inside them. These pocket filters are particulate filters that have a multitude of filter pockets inside, through which the exhaust is forced to flow so that particulate matter contained therein is deposited on the surfaces of these filter pockets. By contrast with the known honeycomb filters, a temperature sensor can be installed in these pocket filters without having to destroy the actual filter structure, i.e. in particular the filter pockets, and without thus limiting the filtering action. In these pocket filters, the temperature sensor can be positioned in the vicinity of the pockets, in contact with the surfaces of the pockets, or inside the pockets. The real volumetric flow through the filter pockets can be determined more precisely based on the temperature detection inside the filter, which achieves an improvement in the correlation of particulate mass to pressure loss.

Determining the temperature inside the particulate filter, in particular during a regeneration, more precisely advantageously permits a more precise calculation or prediction of a future time at which the particulate filter will probably need to be regenerated again, i.e. freed of accumulated particulate matter.

If the knowledge of the precise temperature behavior inside the particulate filter can be used to generate a malfunction message when the temperature inside the particulate filter exceeds a predetermined second, upper threshold, then this is also advantageous because there is a risk at that point of the particulate filter being destroyed. This makes it possible to guarantee or at least improve the service life and durability of particulate filters operated in this manner. In addition, it is possible to reduce the fuel consumption of a vehicle equipped with a particulate filter of this kind because loading intervals can optionally be prolonged, thus requiring less frequent switching to the regeneration mode and its accompanying higher fuel consumption.

The above-mentioned object of the invention is also attained by means of a process for operating an exhaust emission control apparatus equipped with a particulate filter and by means of a computer program for executing this process. The advantages of these embodiments essentially correspond to the advantages mentioned above in relation to the claimed exhaust emission control apparatus.

BRIEF DESCRIPTION OF THE DRAWINGS

Other embodiments and features of the apparatus and process are more fully described herein below, in conjunction with the drawings. in which.

DESCRIPTION OF THE PREFERRED EMBODIMENTS

Figure 1:
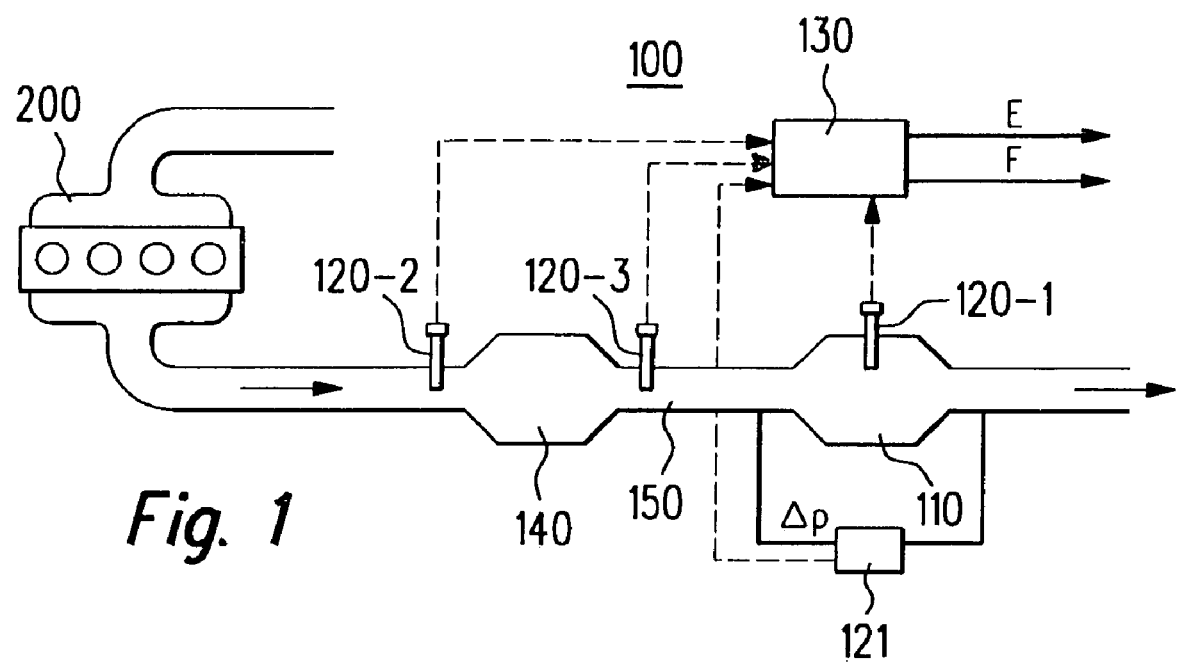
FIG. 1 schematically shows the design of an exhaust emission control apparatus according to the present invention.

FIG. 1 shows the design of an exhaust emission control apparatus 100 for diesel engines 200 according to the present invention. The apparatus contains a particulate filter 110 for filtering particulate matter from the exhaust of the diesel engine 200 during operation. The interior of the particulate filter 110 is provided with a temperature sensor 120-1 for detecting the temperature inside the particulate filter. The temperature values detected by this temperature sensor 120-1 are sent to an evaluation unit 130.

Figure 2:
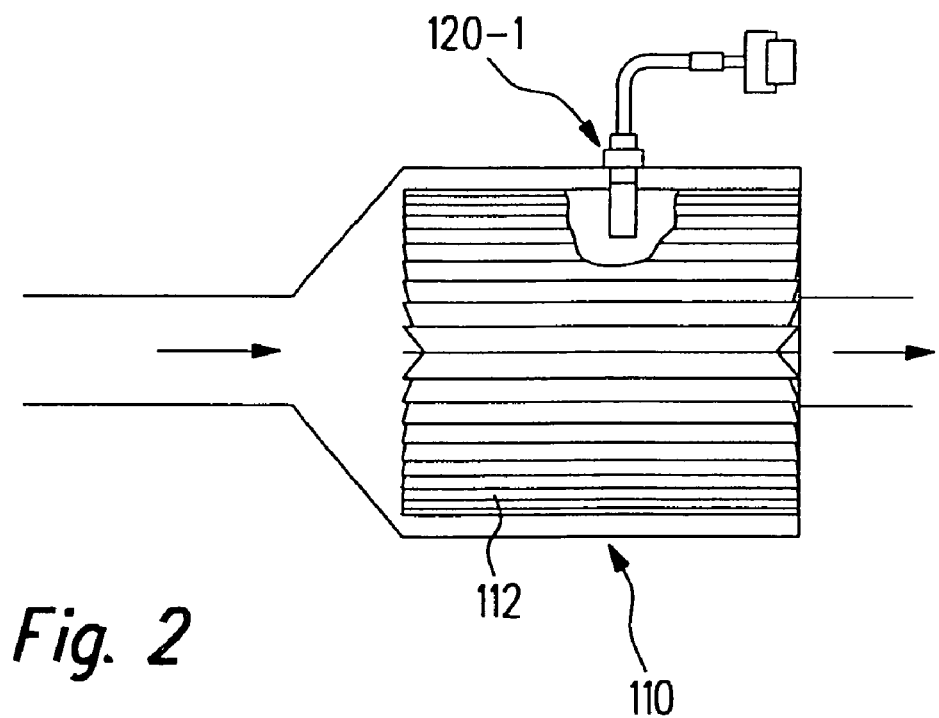
FIG. 2 shows the design of a particulate filter, in particular of a sintered metal filter according to the present invention.

The particulate filter 110 is preferably embodied in the form of a pocket filter as depicted in FIG. 2. In this case, its interior contains a multitude of filter pockets 112 whose surface separates particulate matter out from the exhaust as it flows through the filter pockets 112 during operation of the diesel engine 200. The surfaces of the filter pockets 112 are preferably comprised of sintered metal or of a ceramic material. According to the present invention, the temperature sensor 120-1 is positioned inside a housing of the particulate filter 110. It can be positioned therein either in the vicinity of the pockets, in direct contact with the surface of the pockets, or inside the pockets.

The placement of the first temperature sensor 120-1 inside the particulate filter 110 permits it to detect the temperature inside the particulate filter more precisely than was possible in the prior part. With the aid of this more precise temperature, the evaluation unit 130 is in a position to more precisely calculate physical quantities derived from the detected temperature. In particular, these quantities include the particulate mass burned during a regeneration operation of the particulate filter and the speed at which this combustion occurs, i.e. the burn rate. The more precise knowledge of temperature conditions inside the particulate filter also makes it possible to more precisely calculate the end of a regeneration process, i.e. the time at which all of the previously accumulated particulate mass in a particulate filter will have burned in the course of a regeneration process. In addition, the correlation for calculating the particulate mass based on the differential pressure $\Delta p$ is improved due to the more precise temperature detection and the effective volumetric flow derived from it. The pressure sensor 121 transmits its signals to the evaluation unit 130.

In addition to the particulate filter 110, the exhaust emission control system 100 typically also includes a diesel oxidizing converter 140, which is connected to the particulate filter 110 via a pipe segment 150 and precedes the particulate filter 110 in the flow direction of the exhaust. The converter and filter can also be coupled to each other directly (in a "packet") without an intermediate pipe (the Peugeot system). A second temperature sensor 120-2 can be provided before the oxidizing converter 140 in the flow direction of the exhaust and a third temperature sensor 120-3 can be provided after the oxidizing converter 140. These two temperature sensors are used to detect the temperature of the exhaust at the entry to the oxidizing converter and at the exit from it. The differential pressure sensor 121 serves to determine the load state of the particulate filter. This type of particulate mass determination, however, involves a certain margin of error so that it is not possible to precisely detect the particulate mass in the filter. Correspondingly, it is possible for the filter to assume states in which the correlated particulate mass is less than the actual particulate mass. As a result, higher than expected temperatures can occur in the filter during regeneration operation.

Basically, the particulate filter 110 is switched into a regeneration operating mode whenever the particulate mass that has accumulated in the particulate filter 110 during a preceding operation of the diesel engine 200 has exceeded a predetermined particulate mass threshold $m_{max}$. With the aid of the temperature inside the particulate filter 110 that is detected more precisely according to present invention, this particulate mass threshold can now advantageously be adapted on a regular basis, resulting in an optimization of the time intervals for initiating required regeneration operating modes of the particulate filter.

The adaptive optimization of the time interval for initiating a respective required regeneration operating mode will be described in greater detail below in conjunction with FIG. 3.

Figure 3:
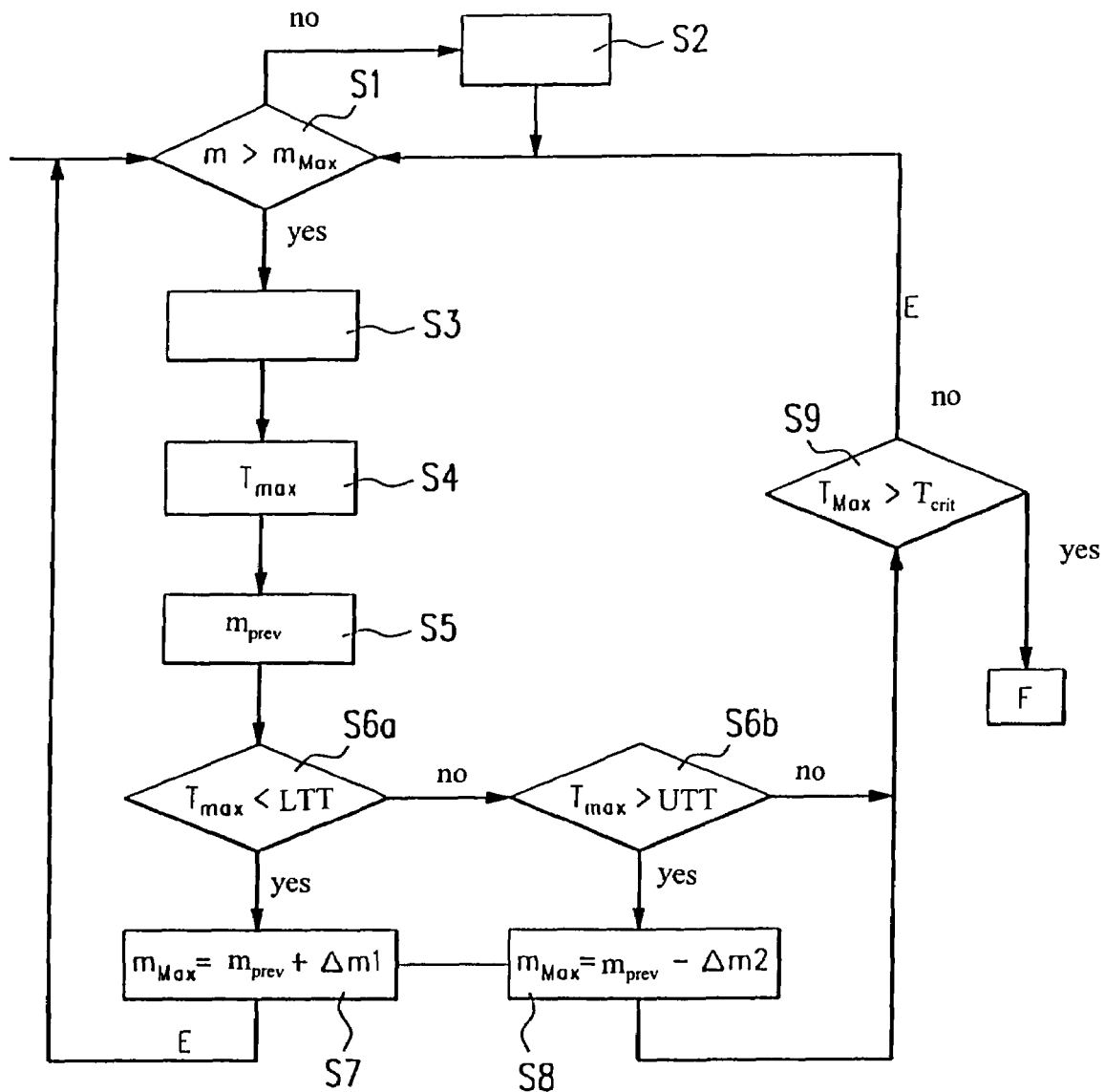
FIG. 3 shows a process for operating an exhaust emission control apparatus and in particular, for operating a particulate filter during a regeneration operating mode.

It is clear from FIG. 3, that during operation of the diesel engine 200, the particulate mass m accumulating in the particulate filter 110 is monitored continuously, see process step S1. This occurs through comparison of the particulate mass m to a predetermined maximum particulate mass threshold $m_{max}$. As long as the particulate mass m has not exceeded this threshold the particulate filter 110 continues to be operated in its normal operating mode, see process step S2. But if the accumulated particulate mass has exceeded the particulate mass threshold $m_{max}$, then in process step three S3, the particulate filter 110 is switched into a so-called regeneration operating mode. In this regeneration operating mode, the particulate mass that has accumulated in the particulate filter 110 up to this point is broken down into carbon dioxide through oxidation, preferably completely. This exothermic reaction causes a characteristic increase in the temperature inside the particulate filter 110. The maximum temperature $T_{max}$ occurring during a preceding regeneration operation of the particulate filter 110 is detected in process step S4 and made available for the execution of the process according to FIG. 3. In a subsequent process step S5, the maximum temperature $T_{max}$ occurring during the preceding regeneration operation of the particulate filter is used to infer the total particulate mass $m_{prev}$ burned during the preceding regeneration operation. This inference is possible due to the known relationship between the maximum temperature and the particulate mass burned. In a subsequent process step S6a, the maximum temperature $T_{max}$ determined in process step S4 is compared to a predetermined lower threshold temperature LTT. If this comparison determines that the maximum temperature detected during the preceding regeneration operation was lower than the lower threshold temperature LTT, then the particulate mass threshold $m_{max}$ previously used in process step S1 is redefined for the initiation of subsequent regeneration operating modes. More precisely stated, in this case, in process step S7, this threshold is defined as the sum of the total particulate mass $m_{prev}$ as determined in process step S5, which was burned during the preceding regeneration operation and essentially represents the previously valid particulate mass threshold, plus a predetermined corrective mass value $\Delta m1$ (raising of the threshold). After this redefinition of the particulate mass threshold, the monitoring of the particulate mass m accumulating in the particulate filter 110 continues in accordance with process step S1.

But if the comparison in process step S6a has determined that the previously detected maximum temperature $T_{max}$ is greater than the lower threshold temperature LTT, then a check is run in process step S6b as to whether the maximum temperature is greater than an upper threshold temperature UTT. If this is in fact the case, then the previously used particulate mass threshold $m_{max}$ is reduced by setting it to a value equal to the mass $m_{prev}$ calculated in process step S5 minus a second predetermined mass correction value $\Delta m2$ (lowering of the threshold). The first and second mass correction values $\Delta m1$, $\Delta m2$ can also be identical to each other. This redefinition of the particulate mass threshold $m_{max}$ occurs in process step S8.

After completion of process step S8, the process moves to process step S9 in which a check is run as to whether the maximum temperature has exceeded a predetermined critical temperature $T_{crit}$, which is greater than the upper threshold temperature. If this is the case, then the evaluation unit 130 generates a malfunction signal F, which indicates a risk to the particulate filter 110 due to an excessive maximum temperature $T_{max}$ having occurred during the last regeneration. However, if process step S9 determines that the detected maximum temperature is not greater than the critical threshold temperature $T_{crit}$, then the evaluation unit 130, just like at the end of process step S7, generates a control signal E, which prompts the continued monitoring of the particulate mass m accumulating in the particulate filter 110 according to process step S1.

The above-described process is preferably implemented in the form of a computer program for an evaluation unit of an exhaust emission control apparatus. The computer program can optionally be stored along with other computer programs on a storage medium that can be read by a computer. The storage medium can be a diskette, a compact disc, a so-called flash memory, or the like. The computer program stored on the storage medium can be sold as a product to a customer. It is also possible, however, for the computer program, possibly accompanied by other computer programs for the exhaust emission control apparatus, to be sold and transmitted to the customer via an electronic communication network, without the aid of a storage medium. In particular, this electronic communication network can be the Internet.

The foregoing relates to preferred exemplary embodiments of the invention, it being understood that other variants and embodiments thereof are possible within the spirit and scope of the invention, the latter being defined by the appended claims.

The invention claimed is:

1. An exhaust emission control apparatus for internal combustion engines comprising:
   a particulate filter for filtering particulate matter from the exhaust of the internal combustion engine;
   at least one temperature sensor for detecting the temperature of the exhaust; and
   an evaluation unit for evaluating the detected temperature;
   the temperature sensor being positioned inside the particulate filter to detect the temperature of the exhaust inside the particulate filter
   wherein the evaluation unit is operable to switch the particulate filter into a regeneration operating mode during the operation of the internal combustion engine in order to burn off the particulate mass (m) that has accumulated in the particulate filter during a preceding operation of the internal combustion engine, this switch being executed once the accumulated particulate mass has exceeded a predetermined particulate mass threshold ($m_{max}$), and
   wherein the evaluation unit is operable to use a maximum temperature ($T_{max}$), which was detected inside the particulate filter by the temperature sensor during a preceding regeneration operation of the particulate filter, to infer the particulate mass ($m_{prev}$) burned during the preceding regeneration operation.

2. The exhaust emission control apparatus according to claim 1, wherein the particulate filter is embodied in the form of a pocket filter having a multitude of filter pockets inside, on the surface of which the particulate matter is deposited when the exhaust passes through the filter pockets during an operation of the internal combustion engine.

3. The exhaust emission control apparatus according to claim 2, wherein the surfaces of the pockets are comprised of sintered metal or of ceramic.

4. The exhaust emission control apparatus according to claim 2, wherein the temperature sensor is positioned in the vicinity of the pockets, in contact with the surface of the pockets, or inside the pockets.

5. The exhaust emission control apparatus according to claim 3, wherein the temperature sensor is positioned in the vicinity of the pockets, in contact with the surface of the pockets, or inside the pockets.

6. The exhaust emission control apparatus according to claim 2, wherein the evaluation unit is operable to switch the particulate filter into a regeneration operating mode during the operation of the internal combustion engine in order to burn off the particulate mass (m) that has accumulated in the particulate filter during a preceding operation of the internal combustion engine, this switch being executed once the accumulated particulate mass has exceeded a predetermined particulate mass threshold ($m_{max}$).

7. The exhaust emission control apparatus according to claim 1, wherein the evaluation unit is operable to change the predetermined particulate mass threshold ($m_{max}$)—and therefore the frequency with which a regeneration operation of the particulate filter is to be executed in future—whenever the maximum temperature ($T_{max}$) detected inside the particulate filter during the preceding regeneration operation is less than a lower threshold temperature (LTT) or is greater than an upper threshold temperature (UTT).

8. The exhaust emission control apparatus according to claim 1, wherein the evaluation unit is operable to generate a malfunction message (F) if the maximum temperature ($T_{max}$) of the exhaust detected inside the particulate filter by the temperature sensor during the preceding regeneration operation exceeds a predetermined critical threshold temperature ($T_{crit}$) which is typically greater than the upper threshold temperature (UTT).

9. The exhaust emission control apparatus according to claim 7, wherein the evaluation unit is operable to generate a malfunction message (F) if the maximum temperature ($T_{max}$) of the exhaust detected inside the particulate filter by the temperature sensor during the preceding regeneration operation exceeds a predetermined critical threshold temperature ($T_{crit}$), which is typically greater than the upper threshold temperature (UTT).

10. The exhaust emission control apparatus according to claim 1, wherein the exhaust emission control apparatus comprises an oxidizing converter, which is connected to the particulate filter optionally via a pipe segment and precedes the particulate filter in the flow direction of the exhaust;
a second temperature sensor positioned before the oxidizing converter to detect the temperature of the exhaust at the entry to the oxidizing converter;
a third temperature sensor positioned between the oxidizing converter and the particulate filter to detect the temperature of the exhaust at the exit from the oxidizing converter; and/or
a pressure sensor to detect the differential pressure via the particulate filter so as to determine the load state of the particulate filter.

11. The exhaust emission control apparatus according to claim 2, wherein the exhaust emission control apparatus comprises an oxidizing converter, which is connected to the particulate filter optionally via a pipe segment and precedes the particulate filter in the flow direction of the exhaust;
a second temperature sensor positioned before the oxidizing converter to detect the temperature of the exhaust at the entry to the oxidizing converter;
a third temperature sensor positioned between the oxidizing converter and the particulate filter to detect the temperature of the exhaust at the exit from the oxidizing converter; and/or
a pressure sensor to detect the differential pressure via the particulate filter so as to determine the load state of the particulate filter.

12. In a process for operating an exhaust emission control apparatus equipped with a particulate filter for filtering particulate matter from the exhaust of an internal combustion engine; the improvement comprising,
the exhaust emission control apparatus including an evaluation unit, wherein the evaluation unit is operable to switch the particulate filter into a regeneration operating mode during the operation of the internal combustion engine in order to burn off the particulate mass (m) that has accumulated in the particulate filter during a preceding operation of the internal combustion engine, this switch being executed once the accumulated particulate mass has exceeded a predetermined particulate mass threshold ($m_{max}$),
wherein the evaluation unit is operable to use a maximum temperature ($T_{max}$), which was detected inside the particulate filter by the temperature sensor during a preceding regeneration operation of the particulate filter to infer the particulate mass ($m_{prev}$) burned during the preceding regeneration operation, and
detecting the temperature of the exhaust inside the particulate filter.

13. The process according to claim 12, further comprising switching the particulate filter into a regeneration operating mode when the particulate mass, which has accumulated inside the particulate filter during an operation of the internal combustion engine, exceeds a predetermined particulate mass threshold ($m_{max}$).

14. In a process for operating an exhaust emission control apparatus equipped with a particulate filter, for filtering particulate matter from the exhaust of an internal combustion engine;
the improvement comprising
detecting the temperature of the exhaust inside the particulate filter,
further comprising switching the particulate filter into a regeneration operating mode when the particulate mass, which has accumulated inside the particulate filter during an operation of the internal combustion engine, exceeds a predetermined particulate mass threshold ($m_{max}$),
wherein after a preceding regeneration operation, the following steps are executed in order to possibly reset the particulate mass threshold ($m_{max}$) and therefore the frequency at which a future regeneration operating mode for the particulate filter is to be initiated:
supplying of the maximum temperature ($T_{max}$) occurring during the preceding regeneration operation;
comparison of this detected maximum temperature ($T_{max}$) to a lower threshold temperature (LTT) and an upper threshold temperature (UTT); and
raising of the particulate mass threshold ($m_{max}$) by a first predetermined corrective mass value ($\Delta m1$) if the detected maximum temperature ($T_{max}$) exceeds the predetermined lower threshold temperature (LTT); or
lowering of the particulate mass threshold ($m_{max}$) by a second predetermined corrective mass value ($\Delta m2$) if the detected maximum temperature ($T_{max}$) exceeds the predetermined upper threshold temperature (UTT).

15. The process according to claim 14, further comprising generating a malfunction message (F) if the maximum temperature ($T_{max}$) detected during the preceding regeneration operation exceeds a predetermined critical threshold temperature ($T_{crit}$), which is higher than the upper threshold temperature (UTT).

16. A computer program with programming code which controls an exhaust emission control apparatus, wherein the design of the programming code enables the exhaust emission control apparatus to execute the process according to claim 12.

17. Computer memory which contains a program with programming code to control an exhaust emission control apparatus, wherein the design of the programming code enables it to execute the process according to claim 12.

* * * * *

UNITED STATES PATENT AND TRADEMARK OFFICE
CERTIFICATE OF CORRECTION

PATENT NO. : 7,572,305 B2
APPLICATION NO. : 10/571105
DATED : August 11, 2009
INVENTOR(S) : Wirth et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 668 days.

Signed and Sealed this

Seventh Day of September, 2010

David J. Kappos
*Director of the United States Patent and Trademark Office*